US010078916B2

(12) United States Patent
Elazary et al.

(10) Patent No.: US 10,078,916 B2
(45) Date of Patent: Sep. 18, 2018

(54) PICK TO AUGMENTED REALITY

(71) Applicant: inVia Robotics, Inc., Agoura Hills, CA (US)

(72) Inventors: Lior Elazary, Agoura Hills, CA (US); Randolph Charles Voorhies, Culver City, CA (US); Daniel Frank Parks, II, Los Angeles, CA (US)

(73) Assignee: inVia Robotics, Inc., Agoura Hills, CA (US)

( * ) Notice: Subject to any disclaimer, the term of this patent is extended or adjusted under 35 U.S.C. 154(b) by 0 days.

(21) Appl. No.: 15/201,143

(22) Filed: Jul. 1, 2016

(65) Prior Publication Data
US 2018/0005446 A1    Jan. 4, 2018

(51) Int. Cl.
*G09G 5/00* (2006.01)
*G06T 19/00* (2011.01)
*G06T 7/20* (2017.01)
*G06T 7/00* (2017.01)

(52) U.S. Cl.
CPC ............ *G06T 19/006* (2013.01); *G06T 7/004* (2013.01); *G06T 7/20* (2013.01); *G06T 2200/04* (2013.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 9,380,207 B1* | 6/2016 | Kozko | ................ | H04N 5/2254 |
| 2003/0084011 A1* | 5/2003 | Shetty | ................... | G06N 3/126 |
| | | | | 706/13 |
| 2007/0029380 A1* | 2/2007 | Keohane | .............. | G06F 11/006 |
| | | | | 235/382 |
| 2010/0121480 A1* | 5/2010 | Stelzer | ................. | B65G 1/137 |
| | | | | 700/215 |
| 2011/0140956 A1* | 6/2011 | Henry | .................... | G01S 19/34 |
| | | | | 342/357.3 |
| 2012/0087212 A1* | 4/2012 | Vartanian | ............... | G01S 15/08 |
| | | | | 367/118 |
| 2013/0044005 A1* | 2/2013 | Foshee | ................ | G09B 21/007 |
| | | | | 340/691.1 |
| 2014/0079286 A1* | 3/2014 | Lee | ..................... | G06K 9/6202 |
| | | | | 382/103 |

(Continued)

Primary Examiner — Frank Chen
(74) Attorney, Agent, or Firm — Los Angeles Patent Group; Arman Katiraei (57) ABSTRACT

The embodiments provide an augmented reality device for increasing human efficiency in navigating a distribution site and retrieving different customer order items from distinct locations within the distribution site. The augmented reality device uses at least one camera to scan reference points distributed across the distribution site. From the scanning, the device determines its position relative to a destination within the distribution site. The device layers over a real-world view, navigational information directing movement of a device user along a most efficient path to the destination. The camera further scans items falling within its field of view. The device performs feature matching in order to identify a particular item of interest within the field of view. The device layers over the real-world view, visual makers distinguishing the particular item from other items as well instructions or other identifying information relating to the particular item.

16 Claims, 11 Drawing Sheets

(56) References Cited

U.S. PATENT DOCUMENTS

| | | | |
|---|---|---|---|
| 2014/0300634 A1* | 10/2014 | Cho | G06T 19/006 345/633 |
| 2015/0019391 A1* | 1/2015 | Kumar | G07G 1/0036 705/28 |
| 2015/0371181 A1* | 12/2015 | Palamarchuk | G05D 1/0234 701/28 |
| 2016/0176635 A1* | 6/2016 | Varley | B65G 1/137 700/216 |
| 2017/0057502 A1* | 3/2017 | Pandita | B60W 50/0098 |

* cited by examiner

PICK TO AUGMENTED REALITY

BACKGROUND INFORMATION

Augmented reality is the layering of digital information over images or a view of the real-world. Augmented reality can be provided through a semi-transparent surface that displays the real-world behind it with the digital information layered atop within the semi-transparent surface. A heads-up display (HUD), head-mounted display (HMD), augmented reality contact lenses, and virtual retinal displays are examples of some devices that can augment real-world images with layered information. Augmented reality can also be provided through a display that presents an image of the real-world captured by a camera and that supplements the image by layering additional digital information over certain locations or objects within the image. Thus, augmented reality can be provided in some form on tablets, smartphones, and other mobile and electronic devices.

Although augmented reality is in its infancy, it has many potential applications. Gaming and entertainment is one application. Another important application is the use of augmented reality to enhance human cognitive ability.

Augmented reality can enhance human cognitive ability by integrating information from a variety of sensors in real-time into the user's field of view. The user can continually monitor measures such as velocity, temperature, and distance as he/she performs tasks that involve those measurements. Augmented reality can also supply users with other timely information or instruction to assist users in completing different tasks.

There is therefore a need to leverage augmented reality to boost worker productivity by increasing human efficiency in different working environments and in completing different tasks. To this end, there is a need to leverage augmented reality to supply workers with timely and relevant information for performance of specific tasks being performed by the user. There is further a need to leverage augmented reality to increase worker skill by providing real-time instruction or information that enhances the capabilities of the worker without the training otherwise needed to develop the applied skills.

BRIEF DESCRIPTION OF THE DRAWINGS

A preferred embodiment for assisting human productivity with augmented reality will now be described, by way of example only, with reference to the accompanying drawings in which.

DETAILED DESCRIPTION OF PREFERRED EMBODIMENTS

In the following detailed description, numerous details, examples, and embodiments are set forth and described. As one skilled in the art would understand in light of the present description, the system and methods are not limited to the embodiments set forth, and the system and methods may be practiced without some of the specific details and examples discussed. Also, reference is made to accompanying figures, which illustrate specific embodiments. It is to be understood that other embodiments can be used and changes can be made without departing from the scope of the embodiments herein described.

The embodiments utilize augmented reality and augmented reality devices to improve human productivity. Some embodiments provide a particular augmented reality application for order fulfillment, especially as it pertains to increasing human efficiency in retrieving different customer order items from distinct locations in a distribution site. To this end, some embodiments leverage augmented reality to assist humans in navigating to a specific destination. Some embodiments further leverage augmented reality to assist humans in retrieving or picking specific items upon reaching the navigated to destinations.

Figure 1:
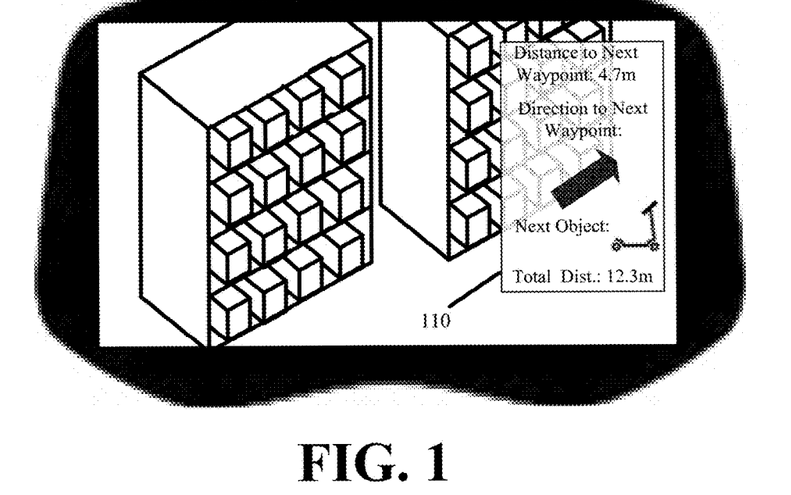
FIG. 1 illustrates the layering of real-time navigational information in the user's field of view in accordance with some embodiments.

To assist in navigation, some embodiments layer real-time navigational information in an augmented reality headset worn by a human worker or user in the distribution site. FIG. 1 illustrates the layering of real-time navigational information 110 in the user's field of view in accordance with some embodiments. The navigational information 110 directs the user to the location of different items in a distribution site. More specifically, the real-time navigational information 110 instructs the user as to when to turn, which direction to move, and the optimal path to a specific destination. Some embodiments continually update the navigational information in relation to the user's position and movements. The navigational information can further optimize the user's path in retrieving multiple items from the distribution site. In other words, the headset can provide navigational information setting forth the most efficient path with which to retrieve multiple items.

Figure 2:
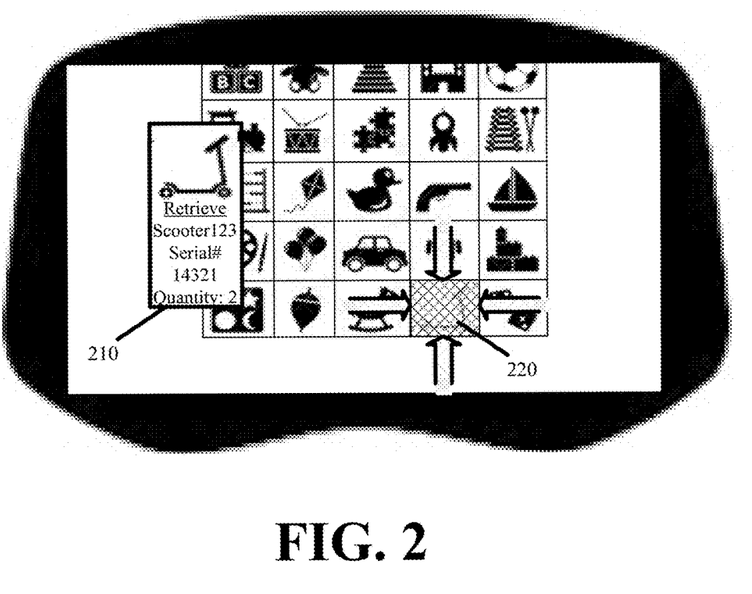
FIG. 2 illustrates layering of identifying information for guiding a user in quickly identifying and retrieving a correct item.

To assist in item retrieval, some embodiments layer identifying information over different items appearing in the real-world view from the augmented reality headset worn by a user. FIG. 2 illustrates layering of identifying information 210 for guiding a user in quickly identifying and retrieving a correct item. As shown, the headset places visual markers to distinguish a specific item 220 from other adjacent items when the specific item is within a user's field of view. The visual marker can include bordering, highlighting, or other graphical methods of distinguishing the specific item from other items. The headset also provides additional information such as a quantity of items to retrieve, special handling or packaging instructions, etc. In some embodiments, the headset tracks remaining item quantities within the distribution site for inventory management based on scanning of the items and detected user interaction with the items.

The augmented reality devices utilized in the implementation of some embodiments include at least one camera, one or more sensors, a power source, wireless network connectivity, a processor, and a semi-transparent surface or screen layering images or information over a presentation of the real-world that appears before or around the device. In some embodiments, the device sensors include inertial sensors, depth cameras, radio beacon receivers, laser scanners, and range finders as some examples.

In some embodiments, the device components are integrated into the frame or body of the device. To make an augmented reality headset more comfortable to wear, some of the components may be located off the headset but connected wirelessly or with wires to the headset. For example, the battery and processor may be located in a backpack, waist pack, cell phone, or laptop that accompanies the user or wirelessly connects to the user's headset. Such offboard configurations allow for stronger processors and larger batteries to drive and power the headset. The offboard configurations are therefore better suited for usage scenarios that involve all-day continuous headset usage.

The real-time navigational information presented in FIG. 1 and item retrieval assistance presented in FIG. 2 can also be presented on a mobile device that accompanies the user as the user moves throughout a distribution site. The augmented reality device of some embodiments need not be a device that is worn on the user's head or that follows the user direct line of sight. The augmented reality can be delivered through a tablet, laptop, smartphone, or hard terminal.

With respect to real-time navigational information, the augmented reality device can generally augment user reality by presenting real-time directional arrows to a destination or item location with the arrows changing based on the user's current position or the orientation and manner by which the user carries the device. Moreover, the device can overlay the navigational information on three dimensional images of the world before the user or device, wherein the images are rendered according to the current device position and orientation.

Figure 3:
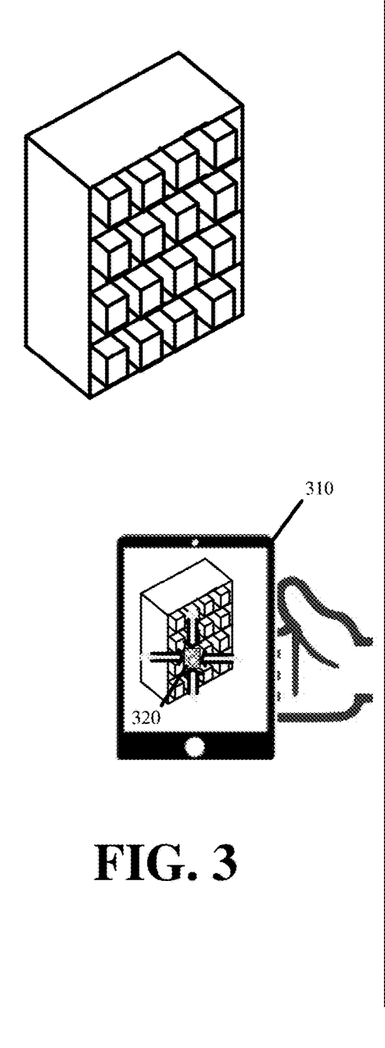
FIG. 3 illustrates augmented reality on a mobile device assisting a user in item retrieval in accordance with some embodiments.
Figure 4:
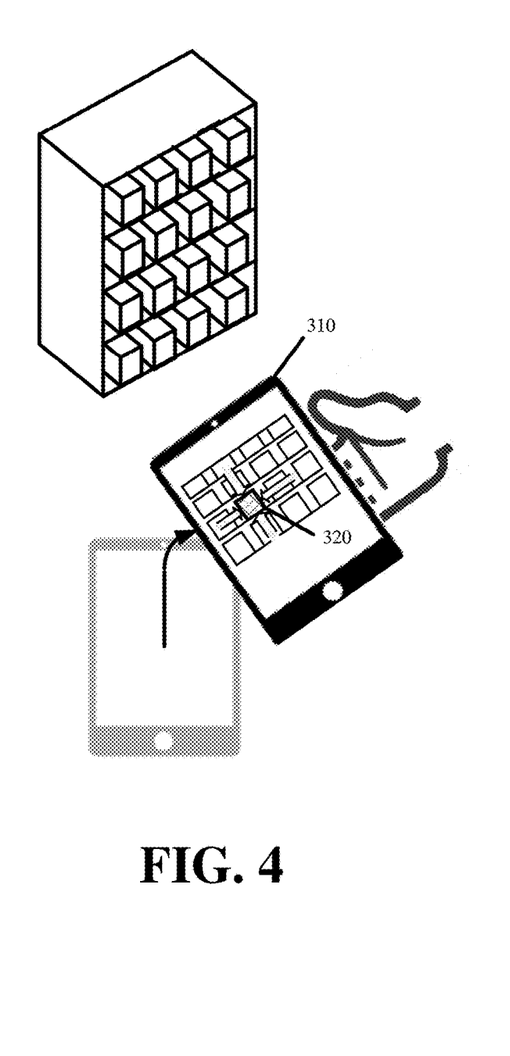
FIG. 4 illustrates how the real-world image changes relative to the device position and orientation.

Similarly, with respect to item retrieval assistance, the augmented reality device can generally augment user reality by presenting images of the item to be retrieved once the user arrives at the item location. FIG. 3 illustrates augmented reality on a mobile device 310 assisting a user in item retrieval in accordance with some embodiments. As illustrated, the device 310 displays an image of the world before the user with the item location 320 within the image being demarcated. FIG. 4 illustrates how the real-world image changes relative to the device 310 position and orientation.

Figure 5:
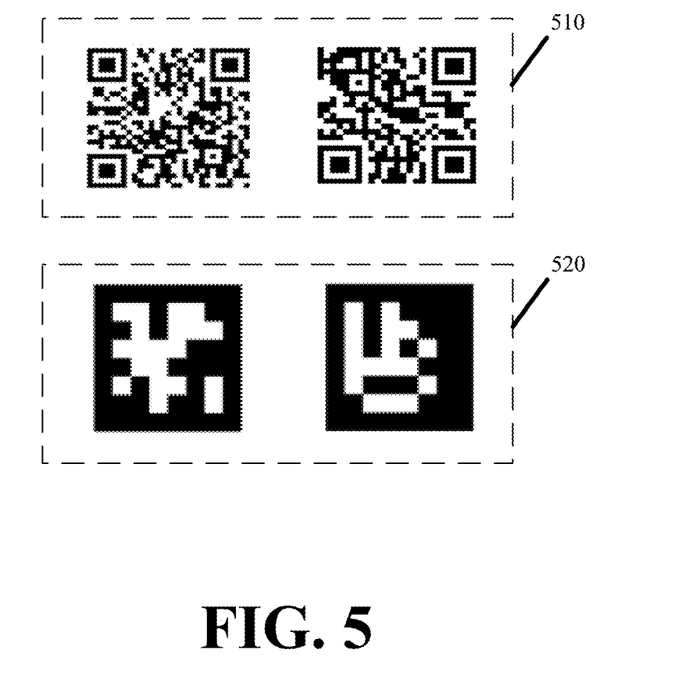
FIG. 5 presents an exemplary subset of high resolution reference points and subset of low resolution reference points in accordance with some embodiments.

The augmented reality of some embodiments is produced in part from local information the augmented reality device extracts from a set of reference points that are dispersed across a distribution site. Each reference point is formed by an arrangement of patterns, lines, shapes, and other symbols or visual identifiers. In some embodiments, the reference points are fiducials. Fiducials of different resolutions can be used depending on the application. High resolution fiducials, such as barcodes and Quick Response (QR) codes, comprise a more tightly condensed set of visual information than low resolution fiducials, such as April tags or April codes. Other fiducials that can be used include ArUco reference points and ARTag reference points as some examples. FIG. 5 presents an exemplary subset of high resolution reference points 510 and subset of low resolution reference points 520 in accordance with some embodiments.

The use of lower resolution reference points within the distribution site are preferred because the augmented reality devices can decipher the lower resolution reference points in less time, with less processing, with less visual accuracy, and from greater distances than high resolution reference points. This is primarily due to the fewer number of features and larger size of each feature in the low resolution reference points 520 relative to the high resolution reference points 510. The larger size of the low resolution reference point features also allows the augmented reality devices to correct for any blurriness that enters into an image or scan of a low resolution reference point via software without affecting the decoding thereof. Consequently, the augmented reality device of some embodiments can image and process the low resolution reference points 520 in real-time as the reference points come into field of view of the device's one or more cameras.

Figure 6:
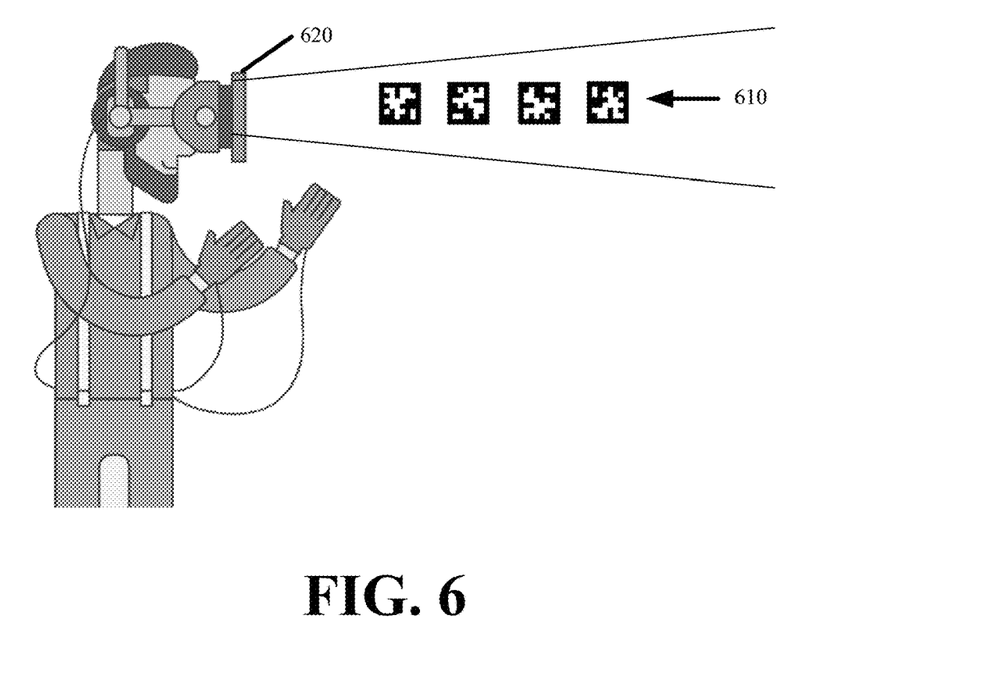
FIG. 6 conceptually illustrates a set of reference points that are about eye-level and therefore align with the one or more cameras of an augmented reality headset when the headset is placed on a user's head.

To assist in the reference point identification and imaging, some embodiments place the reference points about a common vertical plane. FIG. 6 conceptually illustrates a set of reference points 610 that are about eye-level and therefore align with the one or more cameras of an augmented reality headset 620 when the headset 620 is placed on a user's head. The reference points can be affixed to shelving, walls, or any other surface.

Figure 7:
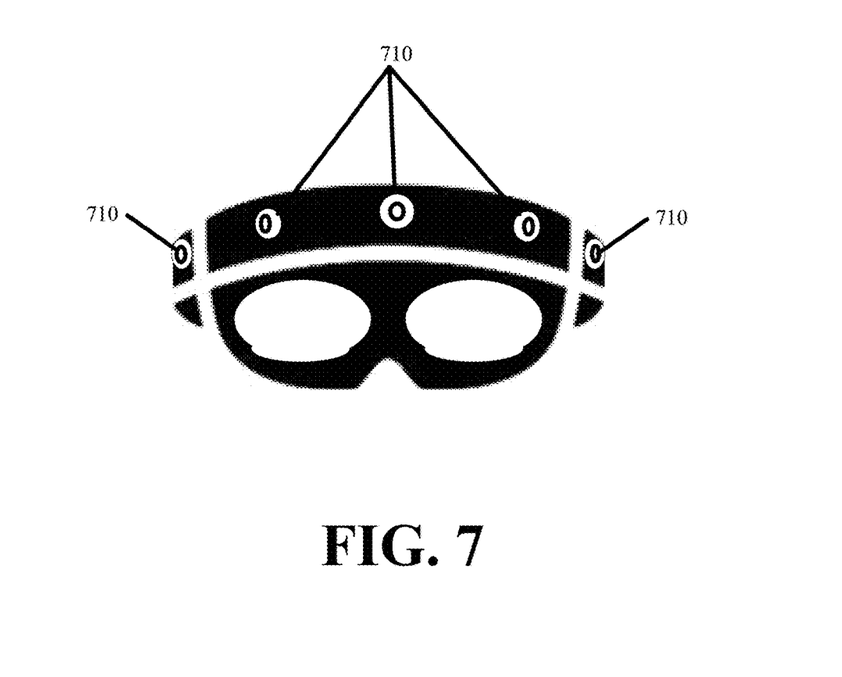
FIG. 7 illustrates a headset with a set of cameras in accordance with some embodiments.

To further assist in the reference point identification and images, some embodiments include multiple cameras around the circumference of the headset or other augmented reality device. The multiple cameras ensure that the headset can scan the reference points at all times without the user having to look directly at the reference points. FIG. 7 illustrates a headset with a set of cameras 710 in accordance with some embodiments. Collectively, the set of cameras 710 have a larger field of view than the user, thereby allowing the headset to scan and obtain information from the reference points even when they are not in the user's direct line of sight. Thus, the user does not have to look directly at the reference points in order for the headset to scan and process the reference points.

The reference points can be encoded with a variety of information. In some embodiments, the reference points are encoded with spatial information, such as three dimensional coordinates. The distribution of some such reference points across a distribution site creates a coordinate frame from which the headsets can locally navigate about the distribution site in three dimensions. Using the local reference points, the headsets are able to compute precise locations without reliance on global positioning system (GPS) or other positioning systems that may be ineffective indoors or in confined spaces, may be unable to provide sufficient positional granularity, and may be unable to link or map to specific items or objects within the distribution site. The reference points can also be encoded with information or identification of a nearby object, a location, a measure, a size, and a cost as some examples. The information can be encoded in two or more adjacent reference points. Various techniques can be used to identify the start and end of such multi-reference point encoded messages.

Figure 8:
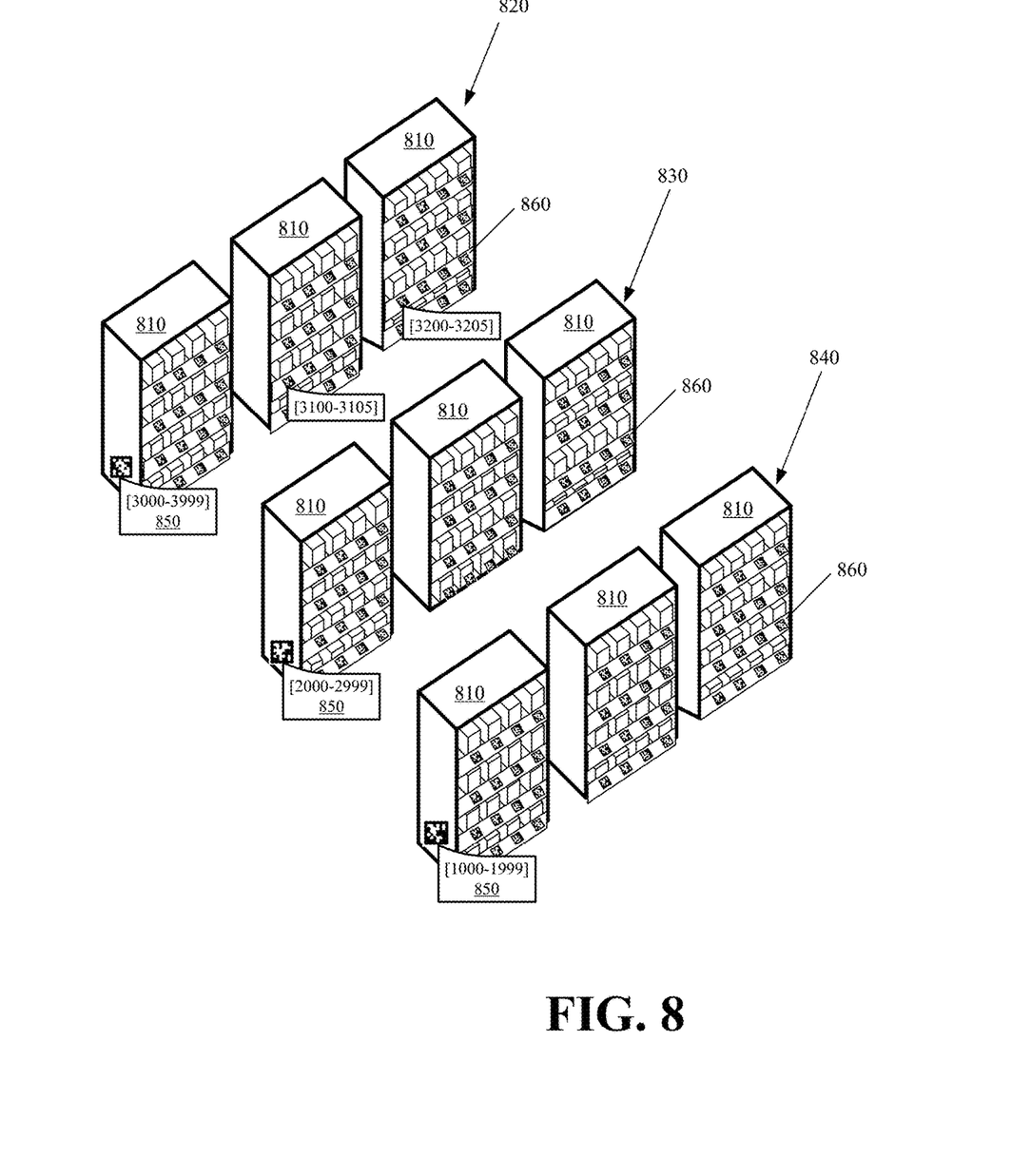
FIG. 8 conceptually illustrates generating a localized coordinate grid with reference points in accordance with some embodiments.

FIG. 8 conceptually illustrates generating a localized coordinate grid with reference points in accordance with some embodiments. The figure depicts a distribution site with several shelves 810 arranged into a set of aisles 820, 830, and 840. At the end of each aisle 820-840 is a first set of reference points 850. As conceptually illustrated, the first set of reference points 850 encode a different thousands value in increasing order. A second set of reference points 860 are positioned across the shelves of each aisle. As conceptually illustrated, the second set of reference points 860 encode different values within the thousands value of the corresponding aisle in increasing order. The first and second sets of reference points 850 and 860 can alternatively encode three dimensional spatial coordinates (i.e., x, y, z coordinates).

Figure 9:
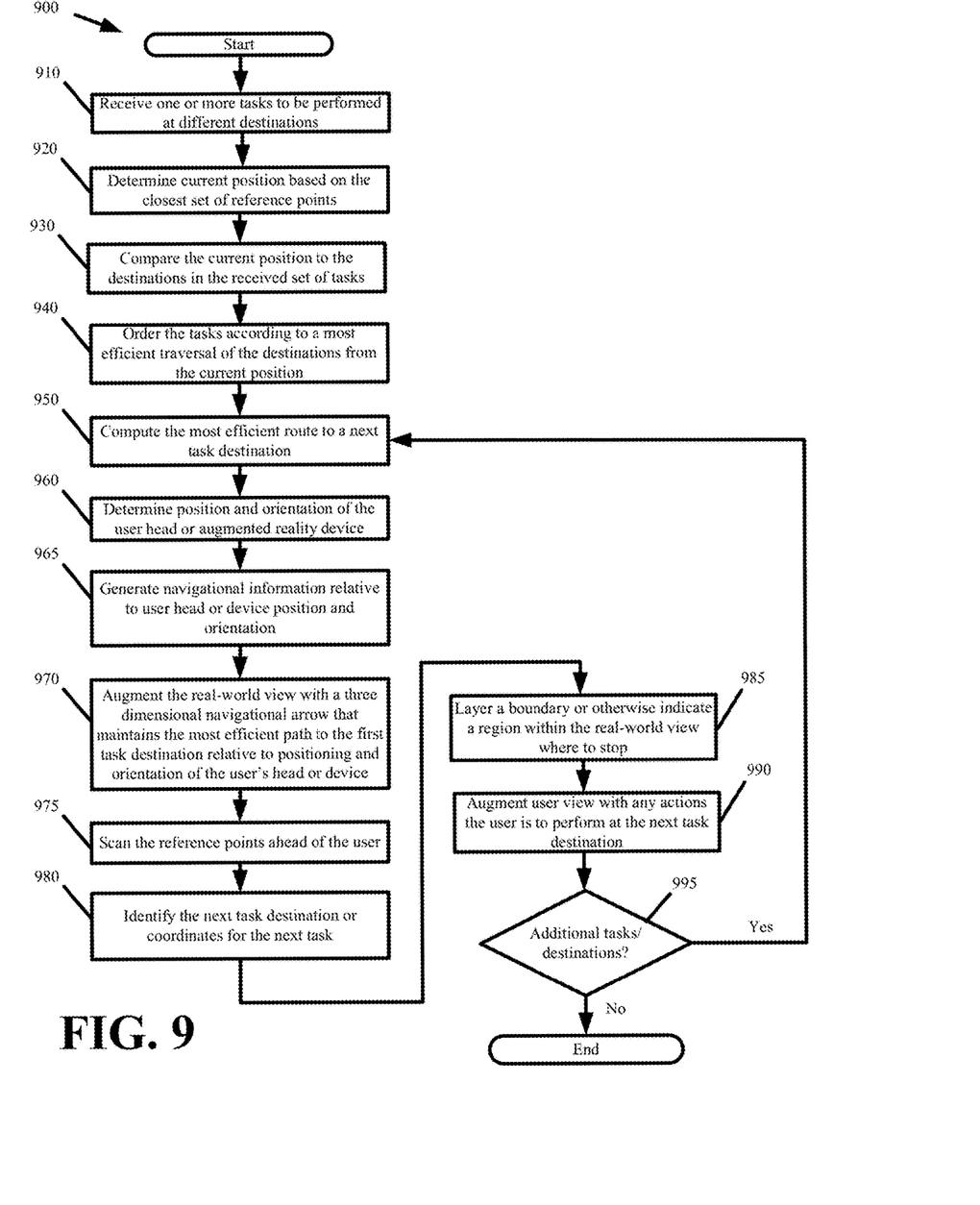
FIG. 9 presents a process performed by the augmented reality device of some embodiments for optimizing user movements in a distribution site.

The augmented reality device of some embodiments is able to optimize user movements in a distribution site using the coordinate grid. FIG. 9 presents a process 900 performed by the augmented reality device of some embodiments for optimizing user movements in a distribution site. Process 900 commences when the user's augmented reality headset or augmented reality mobile device receives (at 910) one or more tasks that the user is to perform. Each task specifies coordinates of a destination that are identified from the reference points distributed across the distribution site. A central coordinator can wirelessly transmit the tasks to the augmented reality device. The central coordinator may coordinate the movements of several users. In such cases, the central coordinator selects the most optimal distribution of tasks amongst the users based on their respective distances to the tasks and the skill level required for the tasks.

The augmented reality device determines (at 920) the device current position within the coordinate grid by imaging and analyzing the reference points that are closest to the augmented reality device. The device compares (at 930) the current position to the destinations in the received set of tasks. The device orders (at 940) the tasks according to a most efficient traversal of the destinations from the current position.

Next, the augmented reality device computes (at 950) the most efficient route to a first task destination. The most efficient route can be the most direct route to the first task destination. Based on the coordinate grid of FIG. 8, the device can determine if the user is in the correct aisle, and if not, the direction that would lead the user to the correct aisle. The device can factor distance as well as congestion, number of obstacles, time of day, positions of other users, and any other parameters when plotting the most efficient route. The device can obtain this ancillary information wirelessly from the central coordinator or through peer-to-peer communication with the augmented reality devices of the other users operating in the same distribution site. In some embodiments, the device does not completely route the path to the destination. Instead, the device determines what direction the user should move in order to reduce the distance to the destination.

Before the augmented reality device can generate the navigational information to direct the user to the first task destination, the device determines (at 960) the position and orientation of the user. In some embodiments, the device determines the position and orientation of the user's head so as to identify where the user facing. In some embodiments, the position and orientation is determined from where the augmented reality device is facing. The device generates (at 965) the augmented reality navigational information relative to this position and orientation. The device augments (at 970) the user's view or device display with a three dimensional navigational arrow that maintains the most efficient path to the first task destination relative to positioning of the user's head or the augmented reality device. Thus, if the user or augmented reality device directly faces, faces away, faces up, faces down, faces to the right, or faces to the left of the first destination, the directional arrow will compensate for the movement and orientation.

The augmented reality device continually updates this information as the user begins moving. The device scans (at 975) the reference points ahead of the user to ensure that the user is moving in the correct direction and to determine when and where the user should stop. As noted above, the device cameras typically have a larger field of view than the user such that the cameras can image the reference points even when the reference points are not directly in the user's line of sight. The device can also detect user motion based on different reference points coming into the device field of view. The device can also detect other parameters, such as the user's velocity, based on the rate at which the reference points change.

The augmented reality device of some embodiments can also allow for state-based positional tracking. In some such embodiments, the device initially orients itself and determines its position with an initial set of reference points or with other means (e.g., GPS). The augmented reality device then extrapolates positioning, orientation, and navigational information based on other sensor information including compasses, accelerometers, and inertial sensors that track the device's direction, rotational velocity, speed, and other parameters. For instance, a compass can detect the direction of movement and accelerometer can determine the average speed of movement. By tracking the time the device moves in the identified direction at the average speed, the device can determine its position without reference to any reference points.

From scanning the reference points ahead of the user or the state-based positional tracking, the augmented reality device eventually identifies (at 980) the first task destination or coordinates for the first task. The device updates its navigational information to direct the user where to stop. In some embodiments, the device layers (at 985) a boundary or otherwise indicates a particular region within the real-world view where the user should move to and stop.

The augmented reality device verifies that the user reaches the first task destination based on the reference points or state-based positional tracking. The device augments (at 990) the user's view with any actions the user is to perform at the first task destination. The device then verifies that the user has completed the task before determining (at 995) if there are additional tasks or destinations to visit. If there are additional tasks or destinations, the process reverts to step 950. Otherwise, the process ends.

Figure 10:
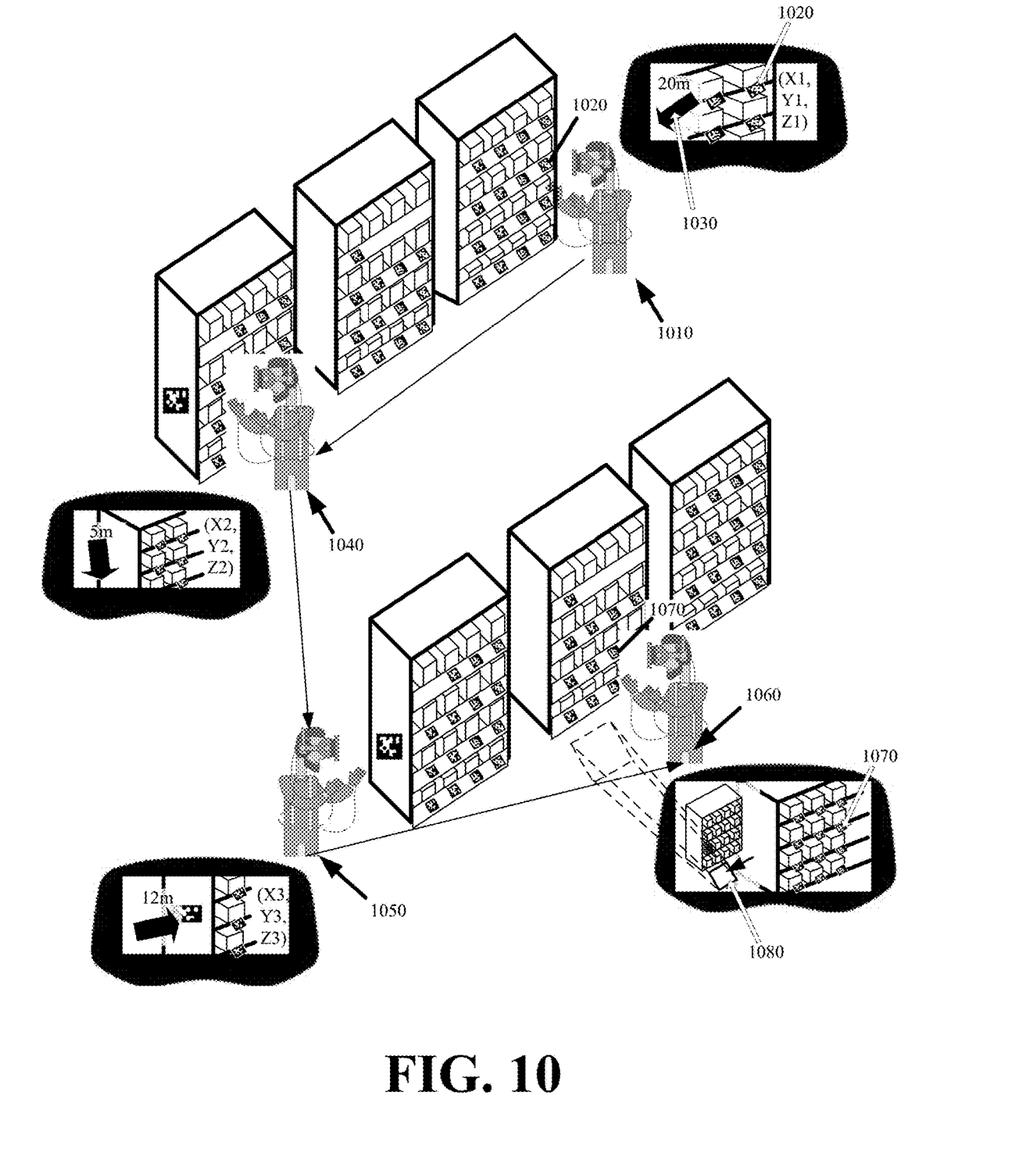
FIG. 10 conceptually illustrates the headset of some embodiments scanning reference points dispersed across a distribution site and providing different augmented navigational guidance based on the scanning of the reference points.

FIG. 10 conceptually illustrates the augmented reality headset of some embodiments scanning reference points dispersed across a distribution site and providing different augmented navigational guidance based on the scanning of the reference points. The figure illustrates a user wearing an augment reality headset at a first position 1010 within the distribution site. At this first position 1010, a first reference point 1020 falls within the headset camera's field of view. The headset decodes positional coordinates from the first reference point 1020 and determines an optimal path to a destination based on the decoded information.

To convey the optimal path to the user, the headset augments the user's real-world view with a directional arrow 1030 and other navigational information for leading the user to the destination. The other navigational information can provide a remaining distance to reaching a next waypoint, a total remaining distance to a desired destination, an image of the destination, or positional coordinates for the current user position.

As the user moves to a second position 1040 and a third position 1050, the headset continues to image and decode the reference points that fall in the camera's field of view in order to ensure that the user is moving towards the destination and to further update the navigational information to direct the user along the most efficient path to the destination. As noted above, the positional tracking can also be performed without the reference points by way of state-based tracking in which different sensors measure the direction and speed of the user's movements. Should the user deviate from the course, alerts can be provided in the display or an alternative course to the destination can be plotted.

The figure then illustrates the user at a final position 1060 within the distribution site. At this final position 1060, a different reference point 1070 is in the field of view of the headset camera. From decoding reference point 1070, the headset determines that the user is nearing the destination and augments the user's real-world view with a position at which the user is to stop. State-based tracking can also be used to determine user proximity to the final position 1060 when reference point 1070 is not present or cannot be scanned. Specifically, the headset sensors measure the distance and direction the user has deviated from a last known position and determine whether the current tracked position is within a threshold distance from the final position 1060.

As shown in the figure, once the user is near the final position 1060, the augmented reality headset layers a visual marker 1080, such as a boundary, over an area within the user's field of view to indicate where the user is to stop. The headset also highlights the item to be retrieved.

As noted above with reference to FIG. 7, the augmented reality device continually adjusts the navigational information and more specifically, the directional arrows directing the user movements, based on the position and orientation of the user's head or the device. Alignment of the directional arrows involves determining the position the user or the device is facing and directing the movement relative to that position. Some embodiments rely on sensors placed about the augmented reality device to deduce the facing direction. The relied upon sensors can include a compass, accelerometers, or inertial sensors.

The facing position and relative directional movements provided by the augmented reality device can also be computed from the imaging of the reference points by the device cameras. If an augmented reality headset contains multiple cameras around the headset, the orientation of the user's head is determined by identifying which camera the reference points appear most prominently in and the position of the camera on the headset. For example, if a particular reference point appears most prominently in a camera about the rightside of the headset, the headset can determine the user is facing north, whereas if the particular reference point appears most prominently in a camera about the leftside of the headset, the headset can determine the user is facing south.

Visual odometry can also be used to determine the position and orientation of the user or device. Visual odometry involves computing a rotation matrix and translation vector from a stream of images. The computation reveals the motion, including position and orientation, of the user or device between the first and last images of the image stream. Visual odometry can therefore track whether the user or device is moving in the proper direction and also to adjust a navigational directional arrow based where the user of device is facing.

Transform computation is another means by which to determine the user's or device's position and orientation relative to the reference points. Generally, the transform computation computes how far a reference point is offset from a directly aligned position and from the offset, determines the position and orientation of the user or device relative to the reference point. The transform computation can reveal if a reference point is above, below, to the right, or to the left of where the user or device is facing.

Figure 11:
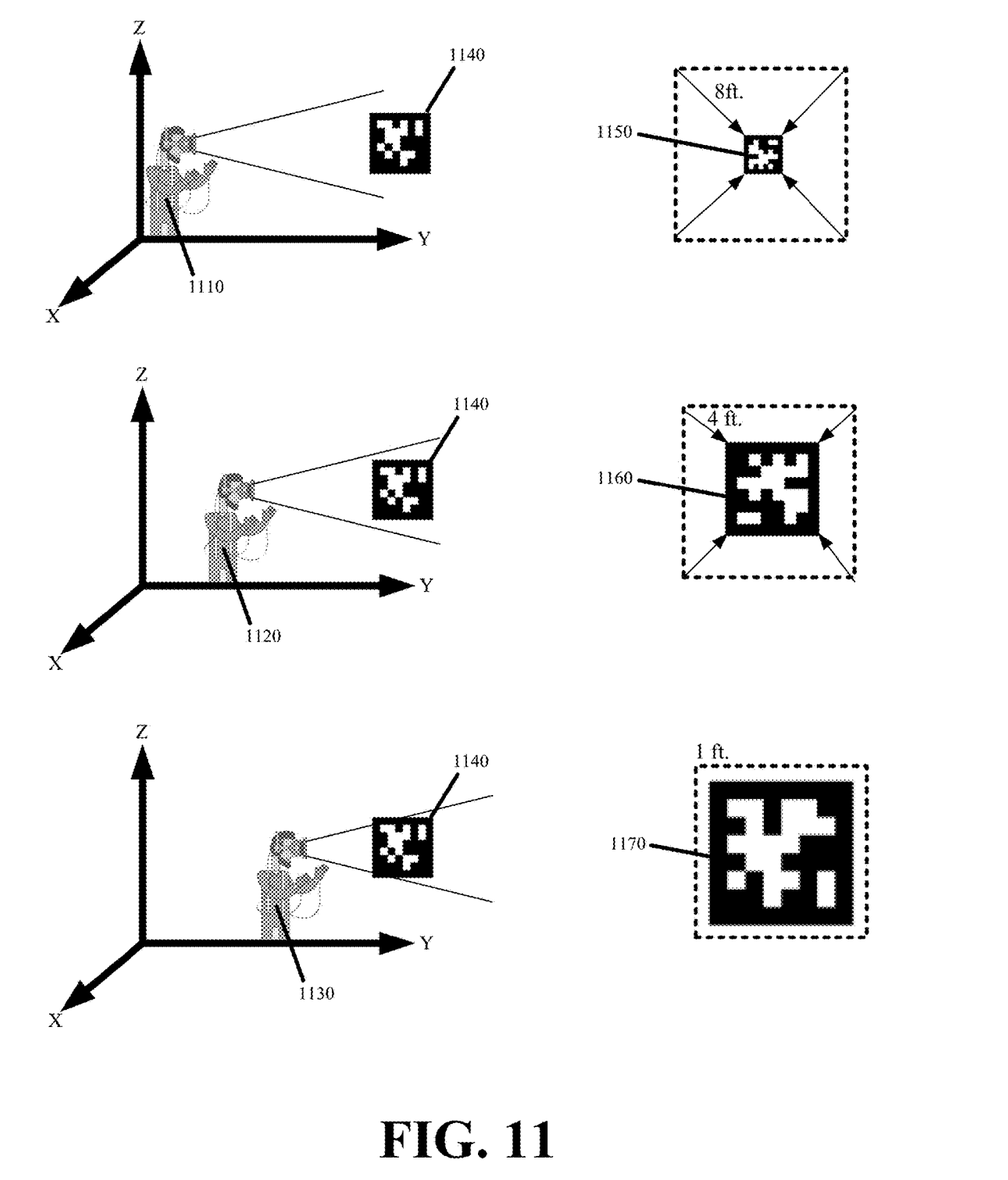
FIG. 11 conceptually illustrates determining the user's distance from a reference point based on transform computation of the reference point image.

FIG. 11 conceptually illustrates determining the user's distance from a reference point based on transform computation of the reference point image. The figure illustrates a user at three different distances 1110, 1120, and 1130 from a reference point 1140. The figure also illustrates the corresponding imaging 1150, 1160, and 1170 of the reference point in the headset camera at each of the distances 1110, 1120, and 1130. The headset computes the size of the reference point in each image in order to determine the user's distance from that reference point.

Figure 12:
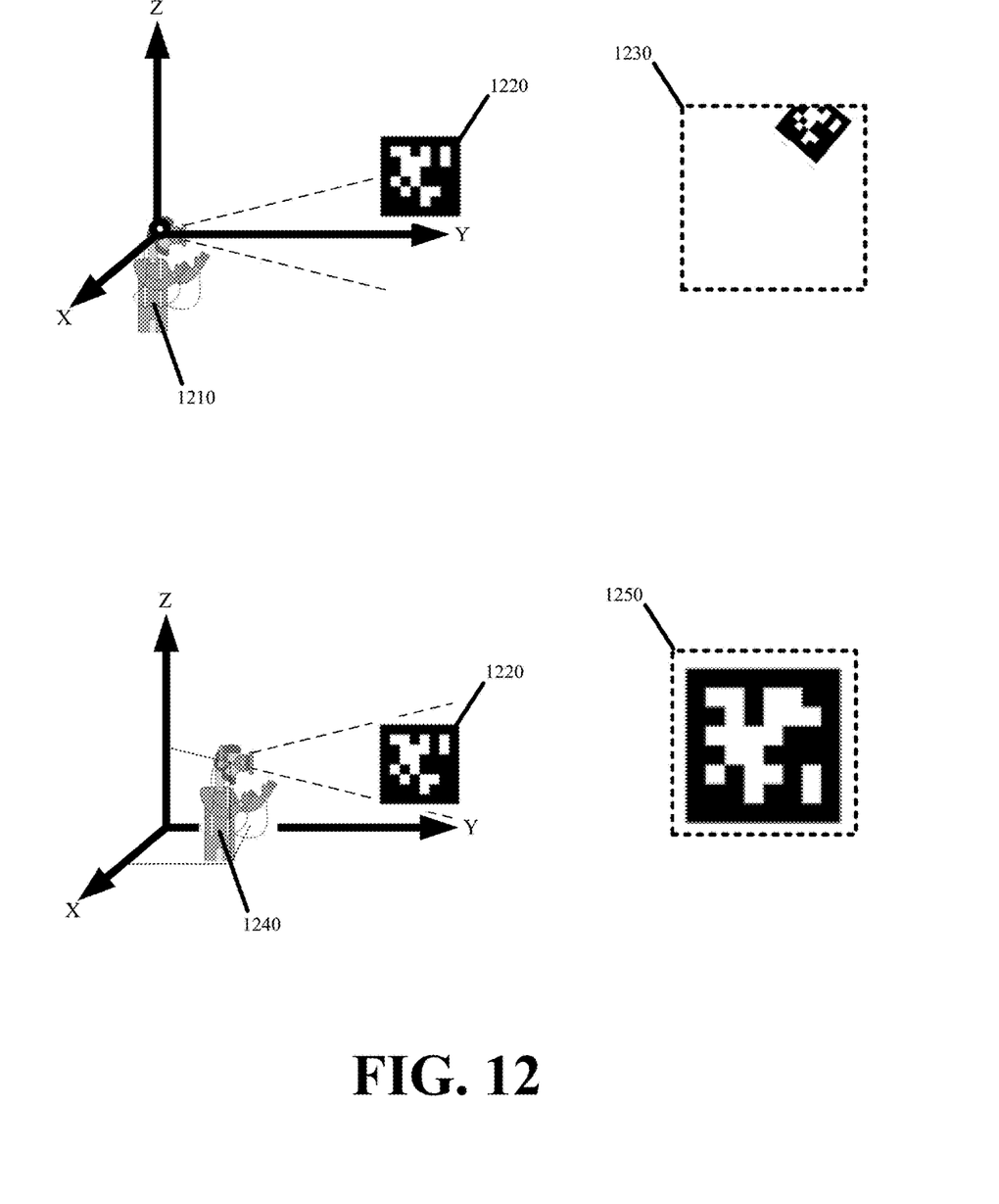
FIG. 12 conceptually illustrates directing user movements in three dimensions based on transform computations of the reference point imaging.

FIG. 12 conceptually illustrates directing user movements in three dimensions based on transform computations of the reference point imaging. The figure illustrates a first user position 1210 from which a destination reference point 1220 enters the user's field of view. The imaging 1230 of the destination reference point 1220 at the first user position is also depicted.

The headset computes a transform of the image in order to determine three dimensional movements the user has to make in order to arrive before the destination. The headset conveys the movements to the user via the headset while continuing to scan and process the destination reference point 1220.

The user reaches the destination at the second user position 1240. At this position 1240, the transform computation of the destination reference point image 1250 indicates that the user is at a proper position relative to the destination reference point 1220. The computation therefore verifies that the user has reached the destination.

Some embodiments leverage augmented reality to improve human efficiency in performing different tasks upon directing a user to a desired destination. One such task is item retrieval. Item retrieval is complicated by the fact that there may several different items at the destination. The human spends some time scanning to identify a desired item. Further complicating the issue is that different items may be in boxes or containers that make it difficult for the human to quickly and easily distinguish a desired item from other items. Some embodiments leverage augmented reality to make this retrieval task more efficient by automatically identifying and highlighting the desired item for the human.

Figure 13:
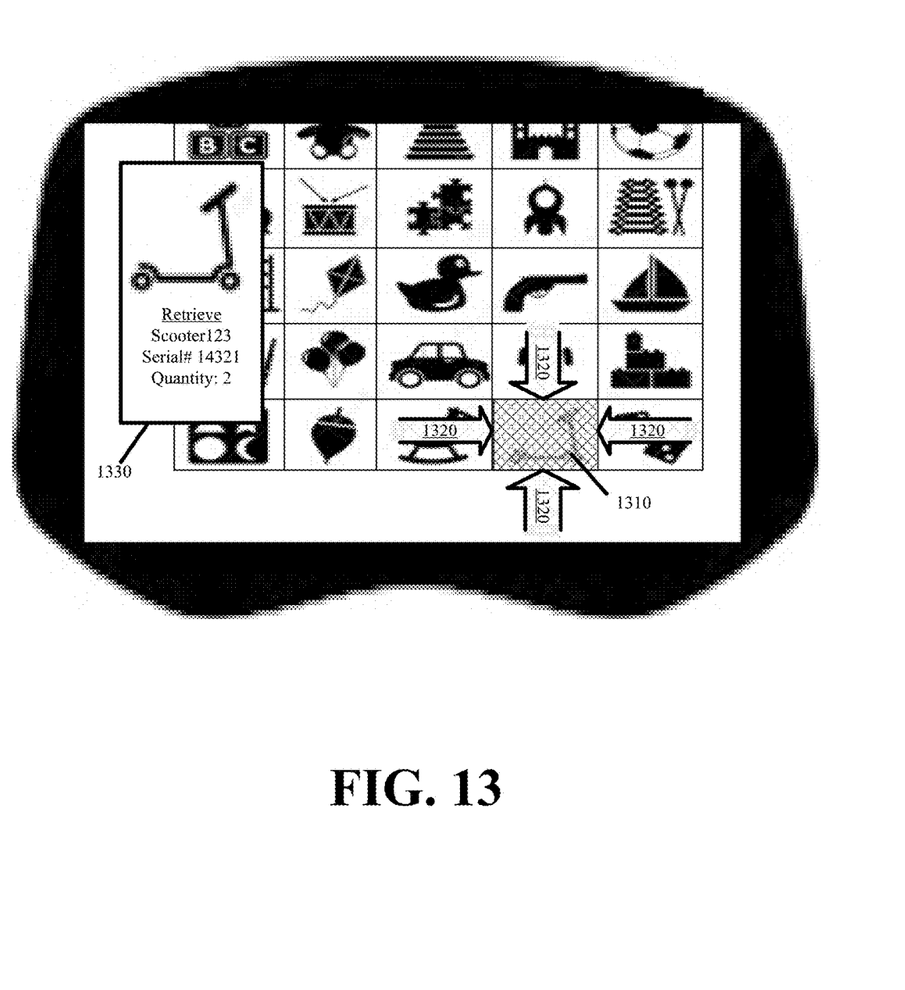
FIG. 13 conceptually illustrates the augmented reality device of some embodiments scanning items adjacent to a destination location and providing augmented identification of order fulfillment instruction based on the scanning of the items.

As the user moves to the destination location, the augmented reality device begins to scan the items that fall into the device camera's field of view. FIG. 13 conceptually illustrates the augmented reality device of some embodiments scanning items adjacent to a destination location and providing augmented identification of order fulfillment instruction based on the scanning of the items. The augmented reality device scans the items to identify a particular item 1310 that is expected to be located at or near the stopping position. The augmented reality device then augments the real-world view with visual indicators 1320 that demarcate and identify the particular item 1310 to the user. As shown, the augmented reality device places a graphical border around the particular item. The figure also shows the real-world view being augmented with information 1330 about the particular item 1310 that can further assist the user in retrieving the correct item. In some embodiments, the augmented information includes an image of the particular item, particular item name, weight, or other identifiers with which the user can verify that he is retrieving the correct item. In some embodiments, the augmented information provides instruction to the user such as a quantity of items to retrieve, packaging instructions, safety warnings, instructions for retrieving the particular item, or assembly instructions when the particular item is to be combined with another item.

In some embodiments, the augmented reality device is able to detect a particular item from many items appearing in the device camera field of view or the device real-world view by scanning unique identifiers, such as a Universal Product Code (UPC) or serial numbers, of the items until the particular item is identified. In some such embodiments, when the augmented reality device receives instruction to retrieve the particular item, the instruction includes the unique identifier used to identify the particular item.

In many instances, the unique identifiers are not within view or are too small for the augmented reality device camera to resolve. Accordingly, the augmented reality device performs feature matching to identify the particular item. Feature matching involves comparing features such as text, coloring, shape, size, graphics, etc. of items falling within the augmented reality device camera field of view or the device real-world view against known features of the particular item.

Figure 14:
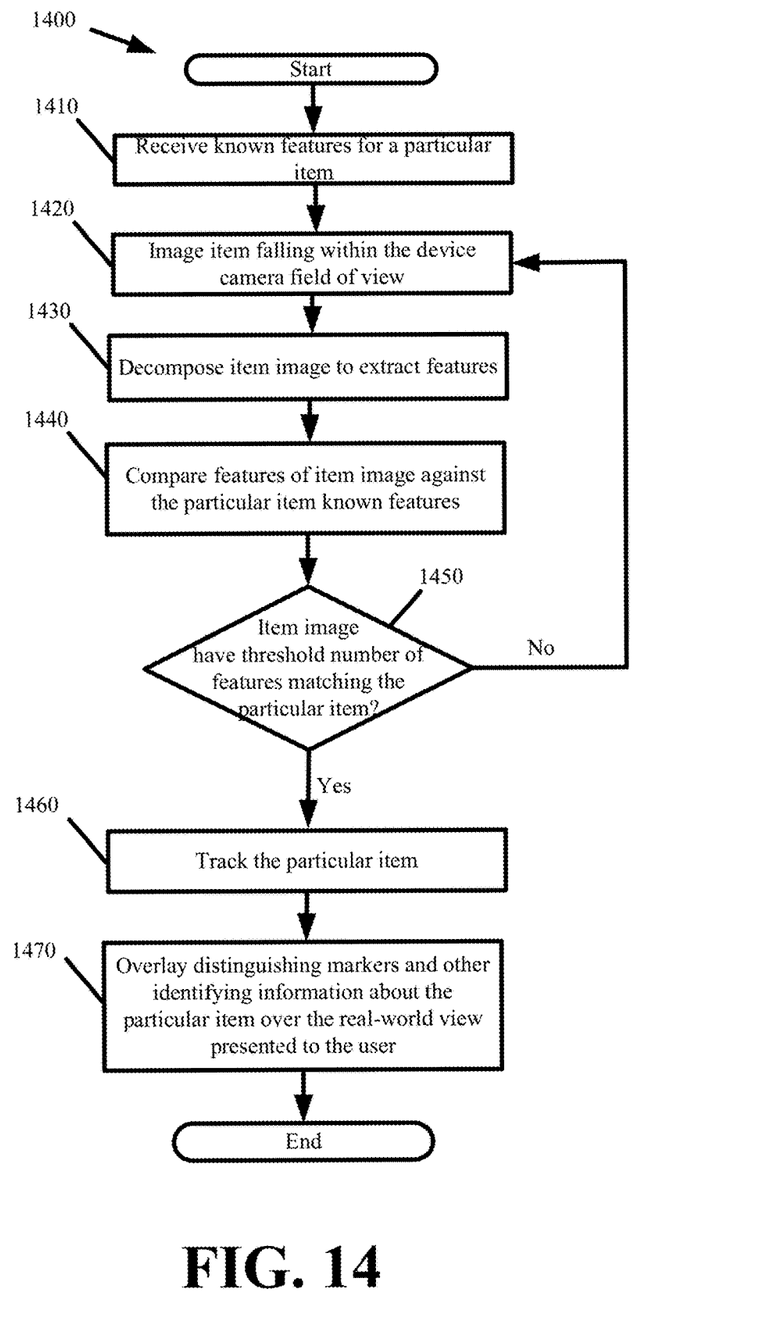
FIG. 14 presents a process for item identification through an augmented reality device in accordance with some embodiments.

FIG. 14 presents a process 1400 for item identification through an augmented reality device in accordance with some embodiments. Process 1400 commences when the augmented reality device receives (at 1410) known features for a particular item that the device is to identify. The device may alternatively be preprogrammed with a database storing features of different items and obtain the known features for a particular item upon receiving an instruction to identify the particular item.

The process continues by imaging (at 1420) an item that falls within the device camera field of view. As feature matching may be processor intensive, the item imaging can be restricted to when the device is within an expected location of the particular item. In other words, process 1400 is not performed while a user wearing or holding the device moves towards an expected location of the particular item. However, once the user nears or arrives at the expected location, the device can begin performing step 1420. In summary, the device may transition from reference point scanning to item scanning upon the human reaching the destination. It should be noted that a single image taken by one of the device cameras can include many different items. The device processor can partition such an image to individual item images.

For each obtained item image, the process decomposes (at 1430) the item image to extract features that are then compared (at 1440) against the known features of the particular item that is of interest. In some embodiments, the image processing including the comparisons is performed in real-time.

The feature mapping is complete as a result of identifying (at 1450) an item image having some threshold amount of features in common with the known features of the particular item. The process then tracks (at 1460) the particular item and overlays (at 1470) the distinguishing markers as well as other identifying information about the particular item over the real-world view presented to the user, thereby assisting the user in efficiently identifying the and retrieving the item. It should be noted that the device cameras can image items that may not be within the user's field of view. This may be the case, for example, when the device cameras are placed around a headset allowing the cameras to stitch together a 360 degree view around the headset. In such cases, the augment reality can notify the user as to where to look in order to bring the particular item within the user's line of sight.

If no match is found, the process can revert to step 1420. The device can also notify the user to move to location with additional items that have not been imaged and processed.

In some embodiments, the device verifies user retrieval of a particular item by tracking the movement of the particular item. If the particular item is removed from a stationary position, the device detects the removal. The device can then wirelessly update an inventory management machine that the item has been removed as well as a quantity removed by the user. The inventory management machine can track inventory of that item to determine if the item supply should be replenished. The device can also update the central coordinator that instructs the user via the device of different items the user is to retrieve. In response to the update, the central coordinator can send the device identifiers for a next item the user is to retrieve. Alternatively, the central coordinator can send the device a list of identifiers for a set of items. After the device verifies retrieval of one item in the set of items, the device can automatically plot a path to a next item in the set of items and provide navigational guidance to direct the user to the next item.

To improve feature matching efficiency, some embodiments limit the number of items from the database that are compared against an unknown imaged item based on the unknown imaged item's location. Each known item can be stored in the database with an expected location indicating where in the distribution site the item is expected to be found. When performing feature mapping of an unknown imaged item, the augmented reality device passes location information as a search parameter to the database. The database then compares features of the unknown imaged item against features of items that are expected to be in a neighboring area to the location of the unknown item. Other items outside the neighboring area are excluded from the feature matching. The continuous item identification can be performed by the device when the database of features is stored locally in device accessible memory. The continuous item identification can also be performed by other machines. The device can send the images to the machines that perform the feature mapping on behalf of the device and send the identified item information back to the device.

The augmented reality device of some embodiments can also be adapted to assist with inventory replenishment or restocking. In some such embodiments, the augmented reality device tracks the number of units a user adds to inventory, reports the updated inventory at the completion of the task, and directs the user to stop adding once inventory reaches a specific amount.

Using any of the techniques described above, the augmented reality device directs the user to the item location. The user brings additional units of the item with him as he travels to the item location. Once at the item location, the device can present an image of the item that the user is to place at the item location. The device can provide additional instruction such as the quantity to add or a desired orientation and placement for the additional units. For instance, the distribution site may want a particular side of the item to be forward facing.

The user stocks additional units per the device instruction. The augmented reality device identifies each new unit that the user adds to the shelf. In particular, the device performs the feature mapping or scans an item identifier to count individual units as they are added to the item location. The feature mapping can also be used to verify that the correct items are added and that the additions follow a desired orientation or placement. For instance, as an item passes before the augmented reality headset, the headset may scan the item barcode to ensure that it is the correct item. The device can signal the user to stop restocking when inventory has reached a desired quantity. The device can wirelessly report the updated inventory or added units to a database or central coordinator, thereby allowing the user to move to the next task without having to manually enter any data.

The device can also log user movements within the distribution site. The central coordinator can determine if the human is properly following navigational and task instructions in the most efficient manner indicated by the device. Thus, the device can track human efficiency and work rate and report the findings to the central coordinator.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
   receiving a destination within a particular site at an augmented reality device, the augmented reality device comprising a plurality of cameras with at least a first camera imaging a field of view in front of the augmented reality device, a second camera imaging a field of view about a right side of the augmented reality device, and a third camera imaging a field of view about a left side of the augmented reality device;
   scanning a plurality of reference points outside a field of view of the first camera with one of the second and third cameras of the augmented reality device;
   detecting congestion along a plurality of paths to the destination based on communications from other augmented reality devices operating in the particular site;
   selecting a particular path from the plurality of paths to the destination based on said scanning of the plurality of reference points and said detecting congestion;
   layering over a real-world view presented by the augmented reality device, navigational information directing movement along the particular path to the destination;
   updating direction and orientation of said navigational information based in part on (i) size and offset positioning of one or more of said plurality of reference points in the field of view of at least one of the first, second, and third cameras and (ii) which of the first, second, and third cameras scan the one or more reference points;
   layering over the real-world view while at the destination, an action for a user to execute on a particular item at the destination, wherein said action comprises one of restocking or retrieving the particular item;
   tracking user retrieval of the particular item from the destination through one or more of the first, second, and third cameras of the augmented reality device; and
   decrementing remaining inventory of the particular item by one unit in response to tracking user retrieval of one unit of the particular item with one or more of the first, second, and third cameras, and by two units in response to tracking user retrieval of two units of the particular item with one or more of the first, second, and third cameras.

2. The method of claim 1 further comprising decoding location information from the plurality of reference points.

3. The method of claim 2 further comprising computing a current position of the augmented reality device based on said location information from the plurality of reference points.

4. The method of claim 3 wherein selecting the particular path to the destination comprises computing time to reach the destination from the current position through each path of the plurality of paths based on distance of each path to the destination and said detecting congestion along each path of the plurality of paths.

5. The method of claim 3 further comprising receiving a plurality of destinations at the augmented reality device.

6. The method of claim 5 further comprising determining a most efficient traversal of the plurality of destinations from the current position, reordering the plurality of destinations according to the most efficient traversal, and selecting the destination as a first destination from the plurality of destinations based on said reordering.

7. The method of claim 1 further comprising identifying arrival at the destination based on a particular reference point coming into the field of view of at least one of said first, second, and third cameras, wherein identifying said arrival comprises layering a stopping position over the real-world view presented by the augmented reality device, and wherein the particular reference point encodes location information identifying the destination.

8. The method of claim 1 further comprising identifying arrival at the destination in response to identifying at the particular item in the field of view of the first, second, and third cameras.

9. The method of claim 8 further comprising layering over the real-world view presented by the augmented reality device, at least one marker identifying said particular item from other items at the destination.

10. The method of claim 1 further comprising determining orientation and the direction of the augmented reality device from performing one of a transform computation or visual odometry on the one or more reference points falling in the field of view of one or more of the first, second, and third cameras.

11. The method of claim 10 further comprising generating said navigational information relative to said orientation and direction of the augmented reality device and updating the navigational information in response to the orientation and direction changing based on device movements.

12. A method comprising
   receiving visual identification features of a particular item from a first sensor of an augmented reality device, wherein the first sensor captures a real-world view before the augmented reality device and the particular item is within said real-world view;

detecting a current location of the augmented reality device in a distribution site using at least one of the first sensor or a different second sensor of the augmented reality device;

identifying in a database storing at least (i) a plurality of known items and (ii) locations of each of the plurality of known items, a set of two or more different known items with locations in particular range of said current location from other known items of the plurality of known items with locations outside the particular range of said current location, wherein the database further stores visual identification features of the plurality of known items and identifying information for the plurality of known items;

retrieving from the database, visual identification features for each known item from the set of two or more different known items resulting from said identifying;

matching the visual identification features of the particular item to the visual identification features of one specific known item from the set of two or more different known items in response to comparing the visual identification features of the particular item against the visual identification features of the set of two or more different known items with locations in the particular range of the current location, said comparing bypassing comparisons against the visual identification features of other known items from the plurality of known items with locations outside the particular range of the current location; and layering over the real-world view presented on a screen or semi-transparent display of the augmented reality device, at least one visual maker distinguishing the particular item from a plurality of other items appearing in the real-world view and the identifying information for the specific known item automatically identified based on said matching of the visual identification features of the particular item to the specific known item, wherein the identifying information comprises at least one of a name, image, weight, and inventory count of the specific known item.

13. The method of claim 12, wherein said matching comprises detecting the specific known item from the plurality of known items by identifying the specific known item as having a threshold number of matching visual identification features with visual identification features of the particular item.

14. The method of claim 12 further comprising layering over the real-world view, instructions a user is to perform with respect to the particular item.

15. The method of claim 12 further comprising receiving a destination where the particular item is expected and layering over the real-world view, navigational information directing movement along a path to the destination.

16. A device, comprising:

wireless network connectivity with which the device receives a destination within a particular site and communications from other devices operating in the particular site;

at least one camera scanning a plurality of reference points in a field of view of the at least one camera;

a display presenting a view from the at least one camera;

a non-transitory computer-readable medium storing a set of processor-executable instructions; and one or more processors configured to execute the set of processor-executable instructions, wherein executing the set of processor-executable instructions causes the one or more processors to:

detect congestion along a plurality of paths to the destination based on the communications from the other devices;

select a particular path from the plurality of paths to the destination based on the scanning of the plurality of reference points and the congestion along each path of the plurality of paths;

layer over the view presented by the display, navigational information directing movement along the particular path to the destination;

update direction and orientation of the navigational information based in part on (i) size and offset positioning of one or more of said plurality of reference points in the field of view of the at least one camera and (ii) which camera of the at least one camera scans the one or more reference points;

layer over the view presented by the display while at the destination, an action for a user to execute on a particular item at the destination, wherein said action comprises one of restocking or retrieving the particular item;

track user retrieval of the particular item from the destination with the at least one camera of the augmented reality device; and decrement remaining inventory of the particular item by one unit in response to tracking user retrieval of one unit of the particular item with the at least one camera, and by two units in response to tracking user retrieval of two units of the particular item with the at least one camera.

* * * * *